United States Patent
Baldi et al.

(10) Patent No.: US 10,412,027 B2
(45) Date of Patent: Sep. 10, 2019

(54) SYSTEM FOR BUILDING COMMUNITY POSTING

(71) Applicant: Otis Elevator Company, Farmington, CT (US)

(72) Inventors: Emily Baldi, East Hartford, CT (US); Harrison Daniels, Simsbury, CT (US); Paul A. Simcik, Southington, CT (US); Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 236 days.

(21) Appl. No.: 15/476,599

(22) Filed: Mar. 31, 2017

(65) Prior Publication Data

US 2018/0287970 A1   Oct. 4, 2018

(51) Int. Cl.
*H04L 12/58* (2006.01)
*B66B 3/00* (2006.01)
*G06Q 30/02* (2012.01)
*G06Q 50/00* (2012.01)

(52) U.S. Cl.
CPC ............. *H04L 51/04* (2013.01); *B66B 3/008* (2013.01); *G06Q 30/0251* (2013.01); *G06Q 30/0261* (2013.01); *G06Q 30/0271* (2013.01); *G06Q 50/01* (2013.01); *H04L 51/12* (2013.01); *H04L 51/32* (2013.01)

(58) Field of Classification Search
CPC ......... H04L 51/04; H04L 51/32; H04L 51/12; G06Q 50/01; G06Q 30/0271; G06Q 30/0261; G06Q 30/0251; B66B 3/008
See application file for complete search history.

(56) References Cited

U.S. PATENT DOCUMENTS

| | | | |
|---|---|---|---|
| 5,955,710 A * | 9/1999 | DiFranza | B66B 1/34 187/247 |
| 6,288,688 B1 | 9/2001 | Hughes et al. | |
| 6,341,668 B1 | 1/2002 | Fayette et al. | |
| 6,349,797 B1 * | 2/2002 | Newville | B66B 1/34 187/391 |
| 6,543,582 B2 | 4/2003 | DiFranza et al. | |
| 6,968,362 B2 | 11/2005 | Koch et al. | |
| 7,797,374 B2 | 9/2010 | Prince | |
| 8,743,753 B2 | 6/2014 | Lin et al. | |

(Continued)

FOREIGN PATENT DOCUMENTS

| | | |
|---|---|---|
| CN | 1464382 A | 12/2003 |
| EP | 2922008 A1 | 9/2015 |
| WO | 2016207477 A1 | 12/2016 |

OTHER PUBLICATIONS

Extended European Search Report for Application No. 18170541. 9-1101; dated Jul. 18, 2018; Report Received Date: Aug. 23, 2018; 7 pages.

(Continued)

*Primary Examiner* — Michael A Keller
(74) *Attorney, Agent, or Firm* — Cantor Colburn LLP

(57) ABSTRACT

A method of operating a building information conveyance system is provided. The method comprising: receiving one or more posts from a first user mobile device; determining at least one display screen to display the one or more posts; and displaying the one or more posts on the display screen.

20 Claims, 5 Drawing Sheets

(56) References Cited

U.S. PATENT DOCUMENTS

| | | |
|---|---|---|
| 8,910,309 B2 | 12/2014 | Harrison et al. |
| 9,100,454 B2 | 8/2015 | Holden et al. |
| 9,177,283 B2 | 11/2015 | Singh et al. |
| 9,479,548 B2 | 10/2016 | Jensen et al. |
| 9,479,549 B2 | 10/2016 | Pearson |
| 9,519,886 B2 | 12/2016 | Berger et al. |
| 9,571,443 B2 | 2/2017 | Borger et al. |
| 9,592,993 B2 | 3/2017 | Joyce et al. |
| 2002/0013144 A1 | 1/2002 | Waters et al. |
| 2002/0129995 A1 | 9/2002 | Friedli et al. |
| 2003/0177097 A1 | 9/2003 | Friedli et al. |
| 2004/0266403 A1* | 12/2004 | Boland ............... H04M 3/537 455/412.2 |
| 2007/0040891 A1 | 2/2007 | Calloway |
| 2008/0191418 A1* | 8/2008 | Lutnick ............... A63F 1/00 273/303 |
| 2008/0255870 A1 | 10/2008 | Butler |
| 2010/0299899 A1 | 12/2010 | Johnson, Jr. |
| 2010/0318921 A1 | 12/2010 | Trachtenberg et al. |
| 2011/0047471 A1 | 2/2011 | Lord et al. |
| 2011/0173549 A1 | 7/2011 | Hipskind |
| 2013/0024530 A1 | 1/2013 | Kim et al. |
| 2013/0054714 A1 | 2/2013 | Bedi |
| 2013/0290855 A1 | 10/2013 | Ashcraft et al. |
| 2013/0346867 A1* | 12/2013 | Woods ............... G11B 27/34 715/728 |
| 2014/0040054 A1 | 2/2014 | Elhabr |
| 2014/0173461 A1 | 6/2014 | Shahade |
| 2016/0009525 A1* | 1/2016 | DePaola ............... B66B 1/468 187/380 |
| 2016/0028781 A1 | 1/2016 | Bell et al. |
| 2016/0078659 A1 | 3/2016 | Bartkiewicz et al. |
| 2016/0110899 A1* | 4/2016 | Kalb ............... G06F 17/24 715/202 |
| 2016/0125458 A1* | 5/2016 | Enriquez ............... G06Q 30/0253 705/14.27 |
| 2016/0127875 A1* | 5/2016 | Zampini, II ............... H04W 4/043 370/311 |
| 2016/0294572 A1 | 10/2016 | Shadid et al. |
| 2017/0166417 A1* | 6/2017 | Salmikuukka ............... B66B 1/468 |
| 2018/0041545 A1* | 2/2018 | Chakra ............... H04L 51/32 |
| 2018/0079619 A1* | 3/2018 | Ben Abat ............... B66B 3/008 |

OTHER PUBLICATIONS

Digi-Notice, "Great Content in All Different Sizes", available at http://digi-notice.com/great-content-in-all-different-sizes/, 2017, 4 pgs.

Hootboard, "Digitial Signage unlike any Other", http://about.hootboard.com/digital-signage/, accessed Mar. 31, 2017, 15pgs.

PressReader, "Out goes the bulletin board; Elevator TV informs condo owners", available at: https://www.pressreader.com/canada/ottawa-citizen/20160903/282638917023443, accessed Mar. 31, 2017, 3 pgs.

* cited by examiner

SYSTEM FOR BUILDING COMMUNITY POSTING

BACKGROUND

The subject matter disclosed herein generally relates to the field of information conveyance, and more particularly to a system that facilitates information conveyance in a building.

Corkboard community message boards contain information that is often cluttered, disorganized, and outdated, so much so that the messages on community message boards are often ignored.

BRIEF SUMMARY

According to one embodiment, a method of operating a building information conveyance system is provided. The method comprising: receiving one or more posts from a first user mobile device; determining at least one display screen to display the one or more posts; and displaying the one or more posts on the display screen.

In addition to one or more of the features described above, or as an alternative, further embodiments of the method may include where the display screen is located in an elevator car.

In addition to one or more of the features described above, or as an alternative, further embodiments of the method may include displaying the one or more posts on a second user mobile device.

In addition to one or more of the features described above, or as an alternative, further embodiments of the method may include: detecting a third user mobile device located in the elevator car; and filtering the one or more posts on the display screen located in the elevator car in response to user data of the third user mobile device.

In addition to one or more of the features described above, or as an alternative, further embodiments of the method may include where the user data includes a home location of the third user mobile device.

In addition to one or more of the features described above, or as an alternative, further embodiments of the method may include filtering the one or more posts on the second user mobile device in response to user data of the second user mobile device.

In addition to one or more of the features described above, or as an alternative, further embodiments of the method may include where the user data includes a home location of the second user mobile device.

In addition to one or more of the features described above, or as an alternative, further embodiments of the method may include sorting the one or more posts in the order that the one or more posts are received.

In addition to one or more of the features described above, or as an alternative, further embodiments of the method may include: detecting a third user mobile device located in the elevator car; and sorting the one or more posts on the display screen located in the elevator car in response to user data of the third user mobile device.

In addition to one or more of the features described above, or as an alternative, further embodiments of the method may include: transmitting the one or more posts to a manager device; receiving a remove request for the one or more posts from the manager device; and removing the one or more posts from the display screen and all user mobile devices.

In addition to one or more of the features described above, or as an alternative, further embodiments of the method may include: transmitting the one or more posts to a manager device; receiving a block request for the first user mobile device from the manager device; and blocking posts received from the first user mobile device after the block request is received, wherein the blocked posts are not displayed on any user mobile device or any display screen.

In addition to one or more of the features described above, or as an alternative, further embodiments of the method may include transmitting an alert to the first user mobile device indicating the block request.

In addition to one or more of the features described above, or as an alternative, further embodiments of the method may include where the one or more posts are sent from a social media platform on the user mobile device.

In addition to one or more of the features described above, or as an alternative, further embodiments of the method may include generating on a user interface an add post screen on the user mobile device, the add post screen being configured to allow entry of the post.

In addition to one or more of the features described above, or as an alternative, further embodiments of the method may include where the post may be entered via a verbal input from a user of the user mobile device.

In addition to one or more of the features described above, or as an alternative, further embodiments of the method may include where the display screen in the elevator car is interactive.

In addition to one or more of the features described above, or as an alternative, further embodiments of the method may include: detecting a third user mobile device located proximate the display screen; and filtering the one or more posts on the display screen in response to user data of the third user mobile device.

In addition to one or more of the features described above, or as an alternative, further embodiments of the method may include where the user data includes a destination of the third user device.

According to another embodiment, a building information conveyance system is provided. The building information conveyance system comprising: a processor; a memory comprising computer-executable instructions that, when executed by the processor, cause the processor to perform operations, the operations comprising: receiving one or more posts from a first user mobile device; determining at least one display screen to display the one or more posts; and displaying the one or more posts on the display screen.

According to another embodiment, a computer program product tangibly embodied on a computer readable medium is provided. The computer program product including instructions that, when executed by a processor, cause the processor to perform operations comprising: receiving one or more posts from a first user mobile device; determining at least one display screen to display the one or more posts; and displaying the one or more posts on the display screen.

Technical effects of embodiments of the present disclosure include the ability for a display screen to convey relevant information to users of an elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
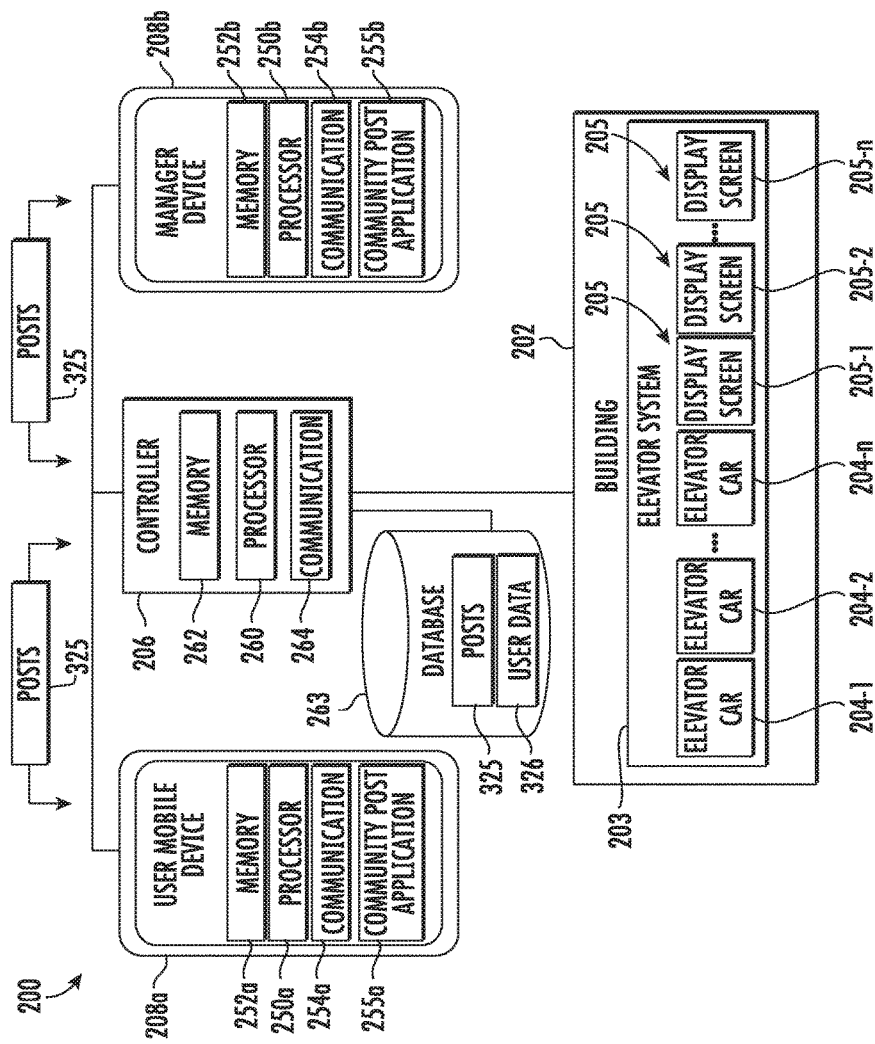
FIG. 1 illustrates a schematic view of a building information conveyance system, in accordance with an embodiment of the disclosure.

FIG. 1 depicts a building information conveyance system 200 in an example embodiment. The building information conveyance system 200 includes an elevator system 203 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more transportation devices, such as the elevator system 203.

The elevator system 203 may be operably connected to one or more computing devices, such as a controller 206. The controller 206 may be configured to control dispatching operations for one or more elevator cars (e.g., elevator cars 204-1, 204-2 . . . 204-n) associated with the elevator system 203. It is understood that the elevator system 203 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration. In general, the elevator cars (e.g., elevator cars 204-1, 204-2, . . . 204-n) may each be referred to as an elevator car 204.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

The elevator system 203 includes one or more display screens 205 (e.g., 205-1, 205-2, . . . 205-n). Although two display screens 205-1 and 205-2 are shown in FIG. 1, it is understood that any number of display screens 205-n may be used. In general, the display screens (e.g., 205-1, 205-2, . . . 205-n) may each be referred to as a display screen 205. The controller 206 may be coupled to each display screen 205 through a hardwired connection and/or connected wirelesly through a cloud computing network. Each display screen 205 is configured to display information. The display screen 205 may be a computer monitor, television screen, tablet, projector, hologram or any other display system know to one of skill in the art. Each display screen may be located proximate the elevator system 203. In an embodiment, the display screen 205 is located in an elevator car 204. In another embodiment, each elevator car 204 contains a display screen 205.

Also shown in FIG. 1 is a user mobile device 208a. The user mobile device 208a may include a device that is typically carried by a person, such as a phone, PDA, smart watch, tablet, laptop, etc. The user mobile device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the user mobile device 208a including executable instructions stored therein, for instance, as firmware. The communication module 254a may implement one or more communication protocols as described in further detail herein. In a non-limiting example, the user mobile device 208a may belong to a resident of the building 202 or an employee who works in the building 202. The user mobile device 208a also includes a community post application 255a that a user may utilize to send posts 325 to a display 205 as described in further detail herein.

Also shown in FIG. 1 is a manager device 208b. The manager device 208b may be a computing device such as a desktop computer. The visitor device 208b may also be a mobile computing device that is typically carried by a person, such as, for example a phone, PDA, smart watch, tablet, laptop, etc. The manager device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the manager device 208b including executable instructions stored therein, for instance, as firmware. The communication module 254b may implement one or more communication protocols as described in further detail herein. The manager device 208b also includes a community post application 255b that a manager may utilize to send posts 325 to a display 205 and regulate the messages posted as described in further detail herein. The manager device 208b may belong to a manager of the building 202 and have superseding authority to the resident mobile device 208a in rejecting or allows posts 325.

The user mobile device 208a and manager device 208b may both be referred to as a device 208 for ease of explanation. Each device 208 may have a unique identification code and/or login that identifies each device 208. The code may be a name, email, or some code linked to the device 208 or user account used for posting. The device 208 and the controller 206 communicate with one another. For example, the device 208 and the controller 206 may communicate with one another when proximate to one another (e.g., within a threshold distance). The device 208 and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the device 208 using one or more communication protocols or standards. For example, the networked element may communicate with the device 208 using near field communications (NFC). In other embodiments, the controller 206 may establish communication with a device 208 that is outside of the building 202. This connection may be established with various technologies including GPS, triangulation, or signal strength detection, by way of non-limiting example. In example embodiments, the device 208 communicates with the controller 206 over multiple independent wired and/or wireless networks. Embodiments are intended to cover a wide variety of types of communication between the device 208 and controller 206, and embodiments are not limited to the examples provided in this disclosure. Communication between the device 208 and the controller 206 will allow the controller 206 to determine the location of the device 208 in relation to the elevator system 203 and/or the door system 205. Knowing the relative location of the device 208 will allow the controller 206 to determine what elevator car 204 the device 208 is currently located in and what to display on the display screen 205 in that elevator car 204.

Posts 325 may be stored in a database 263. The database 263 may be operatively connected to the controller 206 or stored within the controller 206. In one embodiment, the database 263 may be part of a building computer system, stored offsite, remotely, or in the cloud. The database 263 may also store 326 user data 326 that may be specific to each user mobile device 208a. The user data 326 may include information including but not limited to the home location of the user, the age of the user, the gender of the user, hobbies of the user, work place of the user, and any interests of the user.

Figure 2:
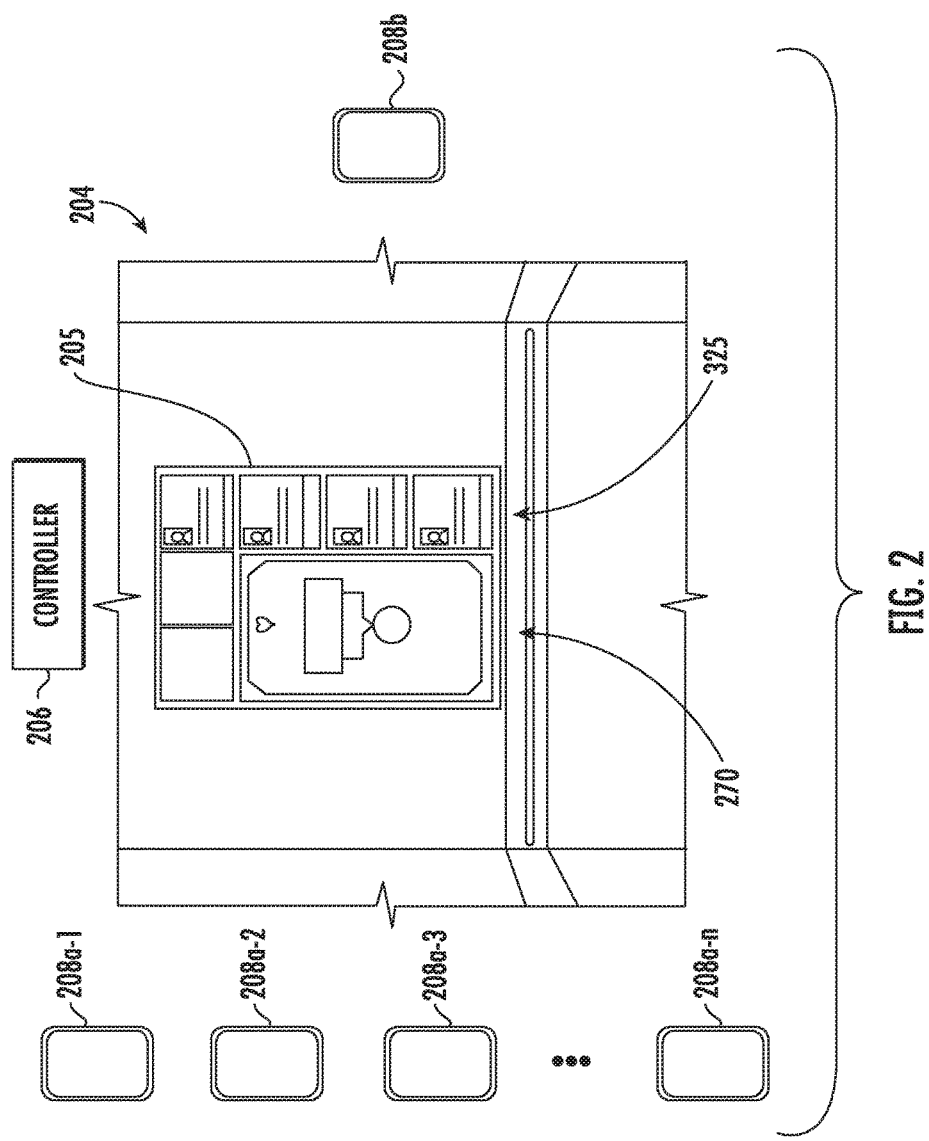
FIG. 2 depicts a user interface on a display screen in an elevator car, in accordance with an embodiment of the disclosure.

FIG. 2 depicts a display screen 205 located in an elevator car 204 in an example embodiment. Referring now to FIG. 2 with continued reference to FIG. 1. It is understood that while FIG. 2 shows a first user mobile device 208a-1, a second user mobile device 208a-2, and a third user mobile device 208a-2, any number of user mobile devices 208a-n may be utilized for posting posts 325 and/or displaying posts 325. Each user mobile device 208a may be located inside the elevator car 204 and/or outside of the elevator car 204 at any time. In the example illustrated in FIG. 2, a first user mobile device 208a-1 may be used to enter the post 325 to be displayed on the display screen 205. In an embodiment, the display screen 205 is located in an elevator car 204. In an embodiment, the display screen 205 may be located in an elevator lobby or elsewhere in the building 202. In another embodiment, the display screen 205 may also be used to display advertisements 270. The advertisements 270 may be paid advertisements and/or general building posts from the building manager posted through the community post application 255b on the manager device 208b. The posts 325 from the first user device 208a-1 may be viewed on any other user mobile device 208a unless the post 325 is blocked by the manager device 208b. In embodiment, the controller 206 may detect the location of a user mobile device 208a in relation to a display screen 205 and adjust the posts 325 being displayed in response to the user mobile device 208a being proximate to the display screen 205. In one example, if the third user mobile device 208a-3 is located in the elevator car 204, the display screen 208 will display posts 325 relevant to the third user mobile device 208a-3. The controller 206 determines which posts 325 to display in response to user data 326 stored in the database 263 (see FIG. 1). In another example, if the display screen 208 is located in a lobby then the display screen 208 may display posts 325 and/or advertisements 270 relevant to lobby stores. In another example, if the display screen 208 is located on a spa floor then the display screen 208 may display posts 325 and/or advertisements 270 relevant to the spa. Alternatively, in another embodiment, the controller 206 may also determine where the device 208 is heading (e.g. a destination of the mobile device 208) and display posts 325 regarding the destination. For example, while in the lobby, the controller 206 may determine that the device 208 is heading to the spa and then the display screen 208 in the lobby may display posts 325 and/or advertisements 270 relevant to the spa. In another example, while in the lobby, the controller 206 may determine that the device 208 is heading to the spa and then the display screen 208 in an elevator car may display posts 325 and/or advertisements 270 relevant to the spa as the device 208 heads to the spa.

Embodiments generate a user interface on the device 208 through a community post application 255a, 255b. The community post application 255a may be used for user of the user mobile device 208a to enter posts 325. For example, a resident may report that they will be having a party and to let them know if it gets too loud.

Figure 3:
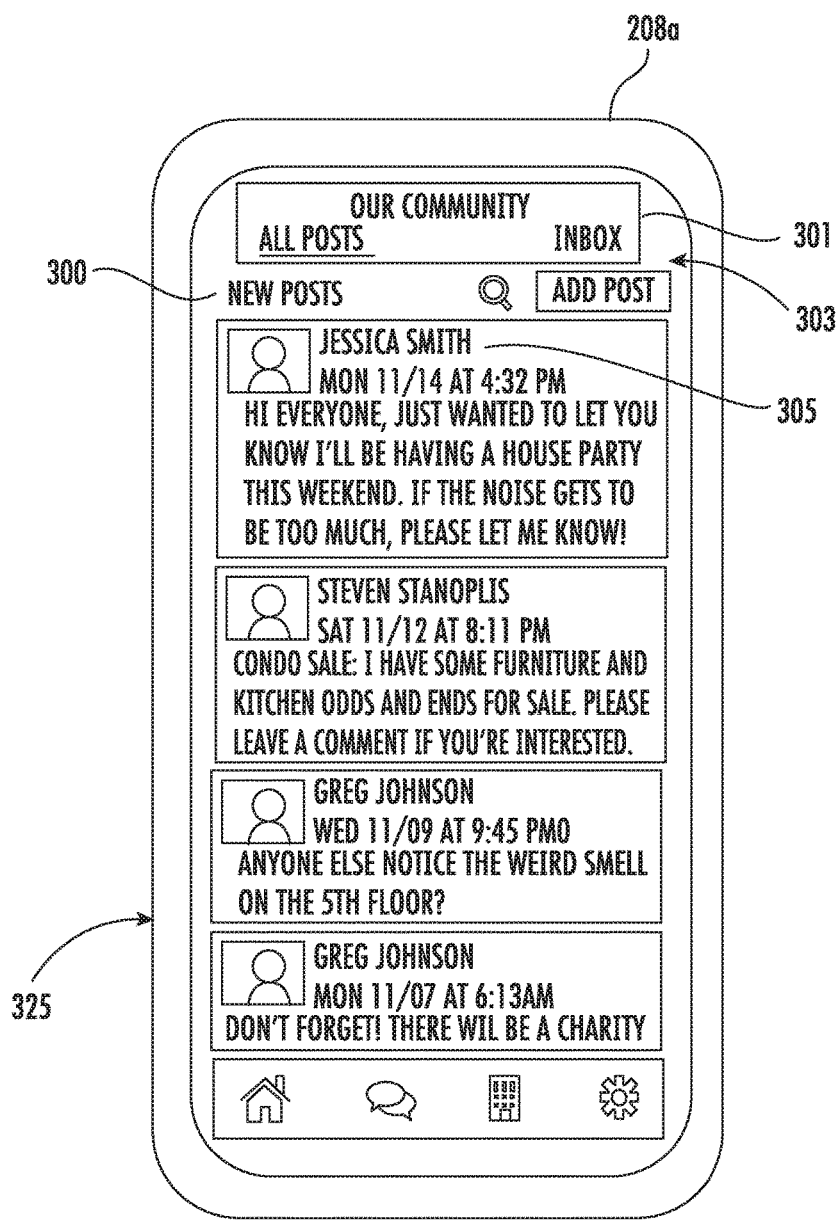
FIG. 3 depicts a user interface on a mobile device, in accordance with an embodiment of the disclosure.
Figure 4:
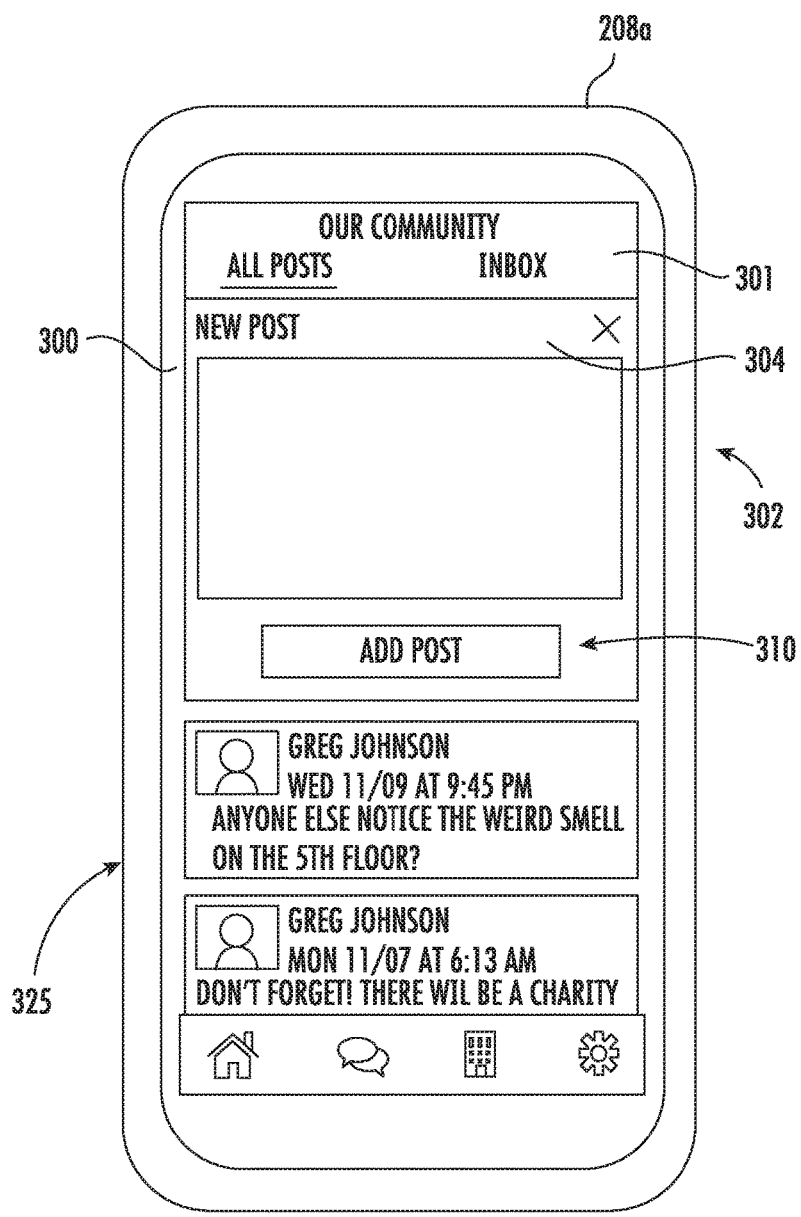
FIG. 4 depicts a user interface on a mobile device, in accordance with an embodiment of the disclosure.

FIGS. 3-4 depict an example user interface 300 on a user mobile device 208a. Referring to FIGS. 3-4 with continued reference to FIGS. 1 and 2, when the user mobile device 208a launches the community post application 255a, an "our community" screen 301 may be presented as shown in FIG. 3. The community post application 255a may display posts 325 entered by various user mobile devices 208a. The source of the posts 325 may be identified by a user name 305. As seen in FIG. 3, the posts 325 may be sorted and the newest post may be seen first. In one embodiment, a user may be able to flag favorite users and have their posts appear first. In one embodiment, a user may be able to block posts from certain users. In another embodiment, the posts 325 may be sorted or filtered by topic tags (ex. social events, building maintenance discussions, etc) or post type (ex. pictures, advertisements, posts by people on the same floor).

In order to enter a post 325, a user can select the "add a post" 303 button, which will prompt the user interface 300 to generate a "new post" section 302 within the "our community" screen 301, as shown in FIG. 4. As seen in FIG. 4, the "new post" section 302 includes a text input section 304 where the new post 325 may be entered. In an embodiment, the post 325 may be manually typed into a text input section 304 by a user of the user mobile device 208a. The text input section 304 is not intended to be limiting as other data input methods may be used, such as, for example drop down menus to display multiple options for data entry. In another embodiment, the post 325 may be entered via a verbal input from a user of the user mobile device 208a. Once a user of the user mobile device 208a has completed entry of their post 325 in the text input section 304, the user may select an "Add Post" button 310 to transmit the post 302 to the controller 206. The controller 206 may then determine which display screen 205 to display the post 325 on. In embodiment, pictures may be included in posts 325. The user may be able to take a picture from the display screen 205 or select an existing picture file from their user mobile device 208-1.

Figure 5:
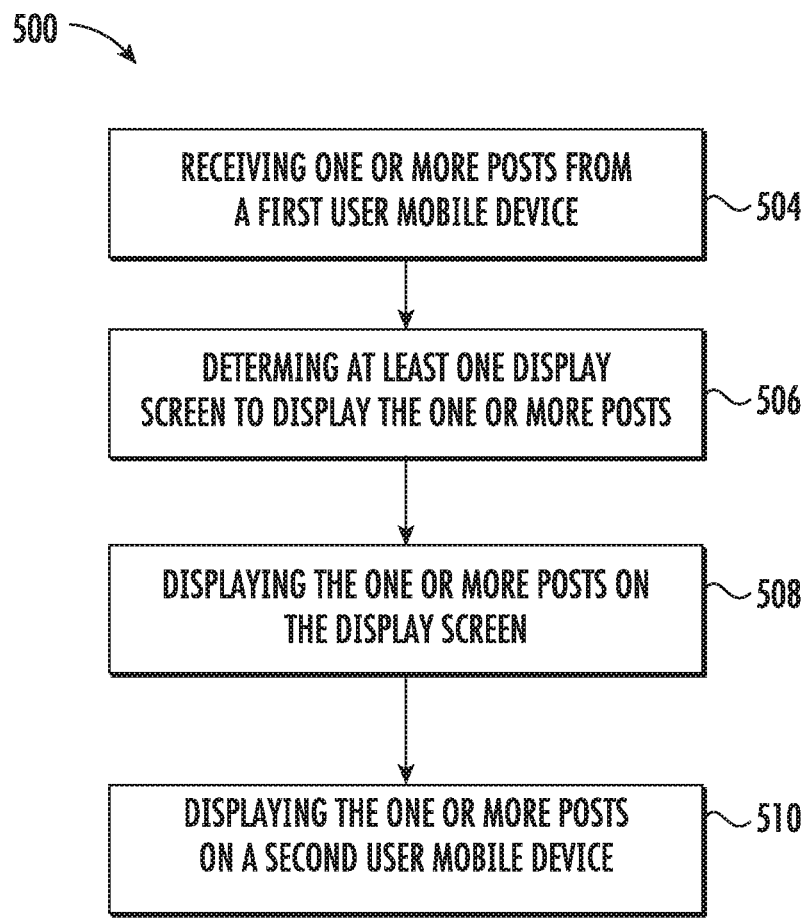
FIG. 5 is a flow diagram illustrating a method of managing maintenance of an elevator system, according to an embodiment of the present disclosure.

Referring now to FIG. 5, with continued reference to FIGS. 1-4. FIG. 5 shows a flow chart of method 500 of operating a building information conveyance system 200, in accordance with an embodiment of the disclosure. At block 504, one or more posts 325 are received from a first user mobile device 208a-1. The posts may be sent from a social media platform including but not limited to Facebook, twitter, Instagram, LinkedIn, or any other social media platform known to one or skill in the art. The posts 325 may be entered via a verbal input on the first user mobile device 208a-1. At block 506, the controller 206 determines at least one display screen 205 to display the one or more posts 325. The controller 206 may determine to post certain posts 325 to certain display screens 205. For instance, if the post 325 is in relation to one side of a building 202 the controller 206 will display the post 325 on display screen 205 on that one side of the building 202.

At block 508, the one or more posts 205 are displayed on a display screen 205. In an embodiment, the display screen 205 is located in an elevator car 204. In an embodiment, the display screen 205 is interactive and a user may scroll through the posts 325 displayed. For example, the user may user their user mobile device 208a to scroll through the posts 325, the display screen 205 may be a touch screen, or the display screen 205 may have a manual scroll button. In an embodiment, the controller 206 may detect when a third user mobile device 208a-3 is located in the elevator car 204 and filter the one or more posts 325 on the display screen 205 located in the elevator car 204 in response to user data 326 of the third user mobile device 208a-3 located in the elevator car 204. In an embodiment, the user data 326 includes a home location of the third user mobile device 208a-3. For example, the home location may be the floor in the building 202 on which the user of the third user mobile device 208a-3 lives. Advantageously, by filtering the posts 325 based on the user data 326, the user may only view information relevant to that user. Additionally, the posts 325 may also be sorted. In one embodiment, the posts 325 may be sorted in order of the posts 325 are received. In another embodiment, the posts 325 may be sorted in response to the user data 326. For example, based on the user data 326 some posts 325 may be more relevant to a user than other posts 325 and the relevancy may drive the sort. At block 510, the one or more posts 325 are displayed on a second user mobile device 208a-2. The posts 325 may also be filtered and/or sorted on the second user device 208a-5, as described above in relation to the display screen 205.

Further, the method 500 may also include transmitting the posts 325 to a manager device 208b. The manager using the manager device 208b may then review the posts 325 and decide whether a particular post 325 should be removed from being displayed on a display screen 205 and/or user mobile device 208a. The manager may use the manager device 208b to send a remove request to the controller 206 in order to remove a post 325. In an embodiment, the manager may be required to approve all posts 325 prior to the post 325 being displayed. Alternatively, the posts 325 may be limited to a maximum number of posts 325 from a user and/or a frequency of posts 325 form a user. The manager may also use the manager device 208b to send a block request to the controller to block a particular user of a user mobile device 208a from posting, thus the posts 325 from that user will no longer be displayed any display screen 205 and/or any user mobile device 208a. An alert may be transmitted to a user mobile device 208a when they have been blocked and/or a post 325 from the user mobile device 208a has been removed. The alert will indicate the block request or the remove request.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a building information conveyance system, the method comprising:
   determining a display screen to display one or more posts, the display screen being mounted to an elevator car;
   displaying the one or more posts on the display screen;
   detecting a first user mobile device located proximate the display screen; and filtering the one or more posts on the display screen in response to detecting the first user mobile device located proximate the display screen and user data of the first user mobile device,
wherein the user data includes at least one of a home location of a user of the first user mobile device, a destination of the user of the first user mobile device, an age of the user of the first user mobile device, a gender of the user of the first user mobile device, a hobby of the user of the first user mobile device, a work place of the user of the first user mobile device, and an interest of the user of the first user mobile device.

2. The method of claim 1, further comprising;
receiving one or more posts from one or more user mobile devices.

3. The method of claim 1, wherein:
displaying the one or more posts on a second user mobile device.

4. The method of claim 2, further comprising:
detecting a third user mobile device located in the elevator car; and
filtering the one or more posts on the display screen located in the elevator car in response to user data of the third user mobile device.

5. The method of claim 4, wherein:
the user data includes a home location of a user of the third user mobile device.

6. The method of claim 3, further comprising:
filtering the one or more posts on the second user mobile device in response to user data of the second user mobile device.

7. The method of claim 6, wherein:
the user data includes a home location of a user the second user mobile device.

8. The method of claim 1, further comprising:
sorting the one or more posts in the order that the one or more posts are received.

9. The method of claim 2, further comprising:
detecting a third user mobile device located in the elevator car; and
sorting the one or more posts on the display screen located in the elevator car in response to user data of the third user mobile device.

10. The method of claim 1, further comprising:
transmitting the one or more posts to a manager device;
receiving a remove request for the one or more posts from the manager device; and
removing the one or more posts from the display screen and all user mobile devices.

11. The method of claim 1, further comprising:
transmitting the one or more posts to a manager device;
receiving a block request for the first user mobile device from the manager device; and
blocking posts received from the first user mobile device after the block request is received, wherein the blocked posts are not displayed on any user mobile device or any display screen.

12. The method of claim 11, further comprising:
transmitting an alert to the first user mobile device indicating the block request.

13. The method of claim 1, wherein:
the one or more posts are sent from a social media platform on the user mobile device.

14. The method of claim 1, further comprising:
generating on a user interface an add post screen on the user mobile device, the add post screen being configured to allow entry of the post.

15. The method of claim 14, wherein:
the post may be entered via a verbal input from a user of the user mobile device.

16. The method of claim 1, wherein:
the display screen in the elevator car is interactive.

17. The method of claim 2, further comprising:
detecting a third user mobile device located proximate the display screen; and
filtering the one or more posts on the display screen in response to user data of the third user mobile device.

18. The method of claim 17, wherein:
the user data includes a destination of a user of the third user device.

19. A building information conveyance system comprising:
a processor;
a memory comprising computer-executable instructions that, when executed by the processor, cause the processor to perform operations, the operations comprising:
determining at least one display screen to display one or more posts, the display screen being mounted to an elevator car;
displaying the one or more posts on the display screen;
detecting a first user mobile device located proximate the display screen; and
filtering the one or more posts on the display screen in response to detecting the first user mobile device located proximate the display screen and user data of the first user mobile device,
wherein the user data includes at least one of a home location of a user of the first user mobile device, a destination of the user of the first user mobile device, an age of the user of the first user mobile device, a gender of the user of the first user mobile device, a hobby of the user of the first user mobile device, a work place of the user of the first user mobile device, and an interest of the user of the first user mobile device.

20. A computer program product tangibly embodied on a computer readable medium, the computer program product including instructions that, when executed by a processor, cause the processor to perform operations comprising:
determining at least one display screen to display one or more posts, the display screen being mounted to an elevator car;
displaying the one or more posts on the display screen;
detecting a first user mobile device located proximate the display screen; and
filtering the one or more posts on the display screen in response to detecting the first user mobile device located proximate the display screen and user data of the first user mobile device,
wherein the user data includes at least one of a home location of a user of the first user mobile device, a destination of the user of the first user mobile device, an age of the user of the first user mobile device, a gender of the user of the first user mobile device, a hobby of the user of the first user mobile device, a work place of the user of the first user mobile device, and an interest of the user of the first user mobile device.

* * * * *